March 28, 1944.  W. G. BRADFORD  2,345,027
PERFORATION CLEANER FOR PIPE
Filed March 19, 1941
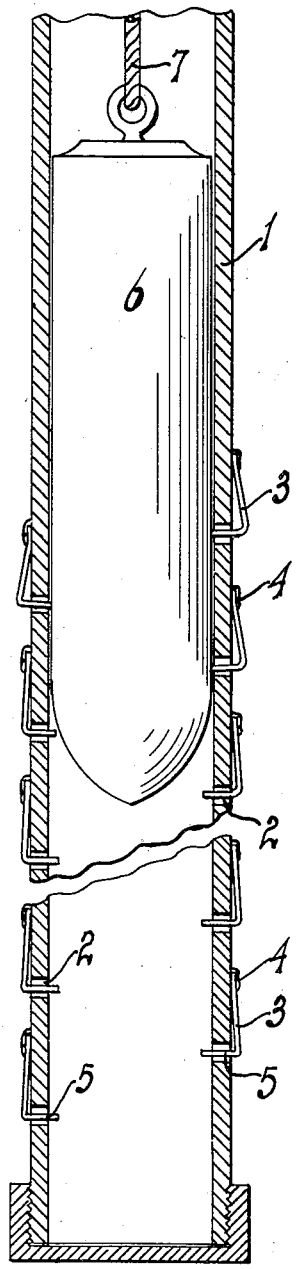
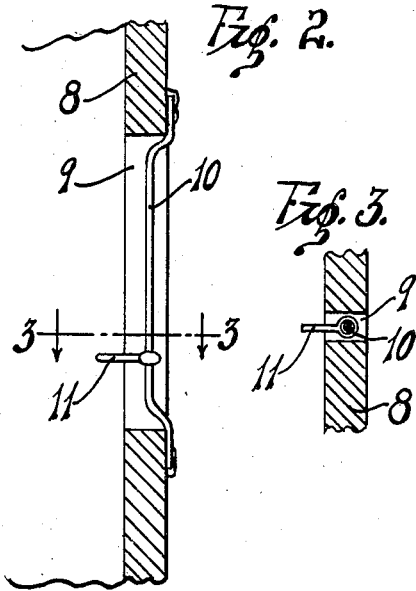
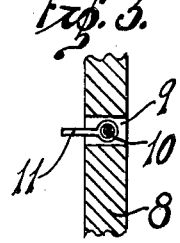
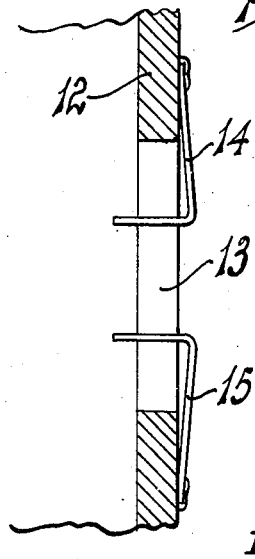
INVENTOR.
WILLIAM G. BRADFORD.
BY
ATTORNEY.

Patented Mar. 28, 1944

2,345,027

UNITED STATES PATENT OFFICE 2,345,027

PERFORATION CLEANER FOR PIPE

William G. Bradford, Whittier, Calif.

Application March 19, 1941, Serial No. 384,158

1 Claim. (Cl. 166—18)

This invention relates to a perforation cleaner for pipe, and particularly that type of pipe known as a liner, and used in oil wells for the purpose of preventing sand, shale, and the like, from moving into the pipe with the flow of oil. The perforations in pipe, such as a liner, are sometimes circular holes, and sometimes elongated slots, these holes or slots being small enough to prevent the sand, shale or the like from flowing into the pipe.

An object of my invention is to provide a novel cleaner for perforations in a pipe consisting of a pin which extends through the perforation, and is so mounted that it can be engaged by a tool on the inside of the pipe, thus moving the pin sufficiently to free the perforation of any material which might be clogging the pipe.

Another object of my invention is to provide a novel means of cleaning the perforations in a pipe, consisting of a flexible pin mounted in the perforation, and extending substantially through the wall of the pipe, and adapted to be engaged by a tool operated on the inside of the pipe, whereby the pins are flexed, thus opening the perforations to the flow of liquid.

A feature of my invention resides in the means of mounting one or more spring wires in each perforation in the pipe, the wire being fixedly attached to the outside of the pipe, and the other end of the wire projecting through the perforation, and extending into the pipe so that it may be engaged by a cleanout tool, which is operated within the pipe.

A further object of my invention is to provide a novel perforation cleaner for pipe which is simple in construction, inexpensive to manufacture, and effective in operation.

Other objects, advantages and features of invention may appear from the accompanying drawing, the subjoined detailed description, and the appended claim.

In the drawing

Figure 1 is a fragmentary longitudinal sectional view of a perforated pipe such as a liner, and showing the cleanout tool in the pipe.

Figure 2 is a fragmentary longitudinal sectional view of a pipe showing a modified form of mounting a cleanout pin.

Figure 3 is a sectional view taken on line 3—3 of Figure 2.

Figure 4 is a fragmentary longitudinal sectional view of another modified form of mounting the cleanout pins on the pipe.

Referring more particularly to the drawing the numeral 1 indicates a pipe such as the liner in an oil well. This pipe is provided with a number of spaced holes 2 through which oil or other liquid flows into the pipe. A cleanout pin 3 is mounted adjacent each of the holes 2, and preferably consists of a piece of bent spring wire, the outer end of which is fixedly attached to the outside of the pipe 1 by means of welding, riveting, a tie band, or other suitable means shown at 4.

The pin 3 is bent, as shown at 5, and this bent portion extends through the perforations 2, and projects a suitable distance into the pipe. When it is desired to clean the perforations 2 a cleanout tool 6 is run into the pipe on the cable 7, or the like, and this tool consists of an elongated cylindrical body. As the tool is moved up and down in the pipe it will engage the inner end of the spring pins or fingers 5, thus causing these fingers to flex up and down in the holes 2, and thus cleaning these holes of any accumulation.

In modified form shown in Figures 2 and 3, the pipe 8 is provided elongated slots 9. A bar 10 is fixedly attached at the top and bottom to the outside of the pipe 8. A pin 11 is slidably mounted on the bar 10, and this pin ejects into the pipe. When the cleanout tool 6 is run into the well the pins 11 will be moved up and down on their respective bars 10, thus cleaning out the material which might be clogging the slots 9. In the modification shown in Figure 4 the pipe 12 is provided with elongated slots 13. In each slot I provide one or more flexible cleanout pins 14 and 15, which are similar in construction to the cleanout pins 3; that is, these pins are made of flexible wire, the outer ends are fixedly attached to the outside of the pipe, and the bent portion of the pins project through the slot, and into the pipe a suitable distance.

When the cleanout tool 6 is operated in connection with this form of my invention both of the spaced cleanout arms 14 and 15 will be operated, the one cleaning out the upper portion of the slot, and the other cleaning out the lower portion of the slot.

Having described my invention, I claim:

In combination with a pipe having vertically spaced perforations in the sides thereof, a cleaner pin for each perforation comprising a single strand of spring wire secured at one end to the exterior of the pipe, the free end portion of the spring wire pin being bent inwardly for disposition through the adjacent perforation in the pipe, the free end of each pin extending into the bore of the pipe to provide a tool engaging portion whereby the portion of the wire pin extending through the perforation may be oscillated to dislodge any accumulations in said perforation.

WILLIAM G. BRADFORD.